United States Patent [19]
Miyahara et al.

[11] Patent Number: 4,896,086
[45] Date of Patent: Jan. 23, 1990

[54] METHOD AND APPARATUS FOR POSITIONING WORKPIECE TO PALLET IN WORKING LINE

[75] Inventors: Masakazu Miyahara, Hiroshima; Kazuo Oda, Higashihiroshima; Tomoyuki Nozaki, Hiroshima, all of Japan

[73] Assignee: Mazda Motor Corporation, Hiroshima, Japan

[21] Appl. No.: 225,789

[22] Filed: Jul. 29, 1988

[30] Foreign Application Priority Data

Jul. 31, 1987 [JP] Japan .................. 62-193518

[51] Int. Cl.⁴ ............................................. G05B 19/18
[52] U.S. Cl. ................................. 318/568.1; 318/567; 364/474.34; 364/513; 414/591; 414/676; 269/20; 269/56; 269/309; 29/563; 198/465.1; 198/345
[58] Field of Search ................. 318/565–574, 318/603, 640; 901/7, 15, 41; 364/513, 481, 489, 579, 474, 191, 474.34; 414/221, 222, 280, 282, 661, 676, 677, 749; 198/345, 339.1, 346.1, 346.2, 465.1, 465.2, 493; 29/563; 269/309, 20, 56

[56] References Cited

U.S. PATENT DOCUMENTS

| | | | |
|---|---|---|---|
| 4,143,868 | 3/1979 | Bergman | 269/20 |
| 4,149,620 | 4/1979 | Rosensweig | 198/345 |
| 4,239,445 | 12/1980 | Ozawa | 269/56 X |
| 4,298,307 | 11/1981 | Bergman | 269/20 X |

FOREIGN PATENT DOCUMENTS 59-120685 8/1984 Japan .

Primary Examiner—William M. Shoop, Jr.
Assistant Examiner—Paul Ip
Attorney, Agent, or Firm—Fleit, Jacobson, Cohn, Price, Holman & Stern

[57] ABSTRACT

A method and an apparatus for positioning a workpiece to a pallet on a working line. The line transports plural kinds of workpieces. Plural positioning pins are provided at various locations on each pallet to enable all the plural kinds of the workpieces to be carried by the pallets. Each positioning pin has a set position and a reset position. All positioning pins are first reset to the reset position. Thereafter, a selected positioning pin is set to the set position to accommodate a particular kind of workpiece. The positioning of the workpiece is accomplished by fitting a positioning hole defined by the selected workpiece onto the selected positioning pin.

11 Claims, 6 Drawing Sheets

METHOD AND APPARATUS FOR POSITIONING WORKPIECE TO PALLET IN WORKING LINE

FIELD OF THE INVENTION

The present invention relates to a method and apparatus for positioning a work piece to a pallet in a working line for machining or assembly of the workpiece.

BACKGROUND OF THE INVENTION

For automatic assembly of a workpiece which is carried in a working line, there has been known a method for positioning the workpiece at a predetermined position on a workpiece carrying pallet by means of providing a positioning pin on the pallet and then fitting a positioning hole of the workpiece to the positioning pin. Such a prior method is disclosed in, for example, the Japanese Utility Model Publication No. 59-120685. In case of different kinds of workpieces which have different configurations carried on the same working line, the position of the positioning pin on the pallet has to be changed or relocated in accordance with each workpiece. Therefore, it is necessary to prepare a plurality of different kinds of pallets which have the position pin arranging at a variety of suitable locations each designed to support a different workpiece and to select one of these pallets in accordance with the particular workpiece passing along the working or production line. As an alternative, one could provide a plural of detachable pins on the pallet and to repeat the steps of setting and removing the pins according to each workpiece passing along the working or production or mass assembly line. In either case, changing the pallets or the pins according to each workpiece passing along the working line is troublesome and to be avoided if possible.

OBJECT AND SUMMARY OF THE INVENTION

Accordingly, it is an object of the present invention to provide a method and apparatus for positioning a workpiece to a pallet in a working line which avoids the foregoing trouble and problem encountered with prior art practices.

Another object of the present invention is to provide a method and apparatus for positioning a workpiece to a pallet in a working line in such a way that it is possible to position different kinds of workpieces which have different configurations to the same pallet.

A further object of the present invention is to provide a method and apparatus for positioning workpieces to pallets in a working line whereby positioning the workpieces to the pallets is effected easily and automatically regardless of the fact that the workpieces may be of different configurations.

In order to accomplish the above described objects of the present invention, a method for positioning a workpiece to a pallet in working line is herein taught which comprises the steps of providing a plurality of positioning pins, each of which is able to take either a set position such that the positioning pin protrudes from a workpiece set surface of the pallet or a reset position such that the positioning pin sinks or is retracted under or beneath the workpiece set surface of the pallet. The positioning pins are distributed at suitable locations in the pallet sufficient to support all the different kinds of workpieces intended to pass along the working line. Initially the positioning pins are all reset to the reset position, then, a particular or preselected positioning pin selected from the plurality of position pins is set to the set position in accordance with the workpiece intended to be put on the pallet, and then, the intended workpiece is positioned on the pallet by fitting a positioning hole defined by that workpiece to the particular or preselected set positioning pin.

The apparatus of the present invention achieves the objects stated above by a structure that comprises a pallet having a workpiece set surface on which a workpiece is to be set, a positioning means for positioning the workpiece on the pallet which has a plurality of positioning pins provided at suitable locations in the pallet sufficient to support all the different kinds of workpieces. Each of the positioning pins is structurally arranged to be able to take either a set position in which the positioning pin protrudes from the workpiece set surface of the pallet or a reset position in which the positioning pin sinks or is retracted under or beneath the workpiece set surface of the pallet. A resetting means is provided for resetting all the positioning pins to the reset position, and a setting means is provided for moving a preselected or particular positioning pin selected from the plurality of positioning pins to the set position from the reset position in accordance with a designated workpiece intended to be put on the pallet so that the particular positioning pin registers, is received in, or fits into a positioning hole defined by the designated workpiece. The present invention, obviates the problems and troubles of prior art practices by providing a single pallet passing along a working line which can serve a plurality of different kinds or configurations of workpieces.

The above, and other objects, features and advantages of the present invention will become apparent from the following detailed description which is to be read in conjunction with the accompanying drawings.

DESCRIPTION OF THE PREFERRED EMBODIMENT

The invention will now be described by way of example with reference to a preferred embodiment and the accompanying drawings.

Figure 1:
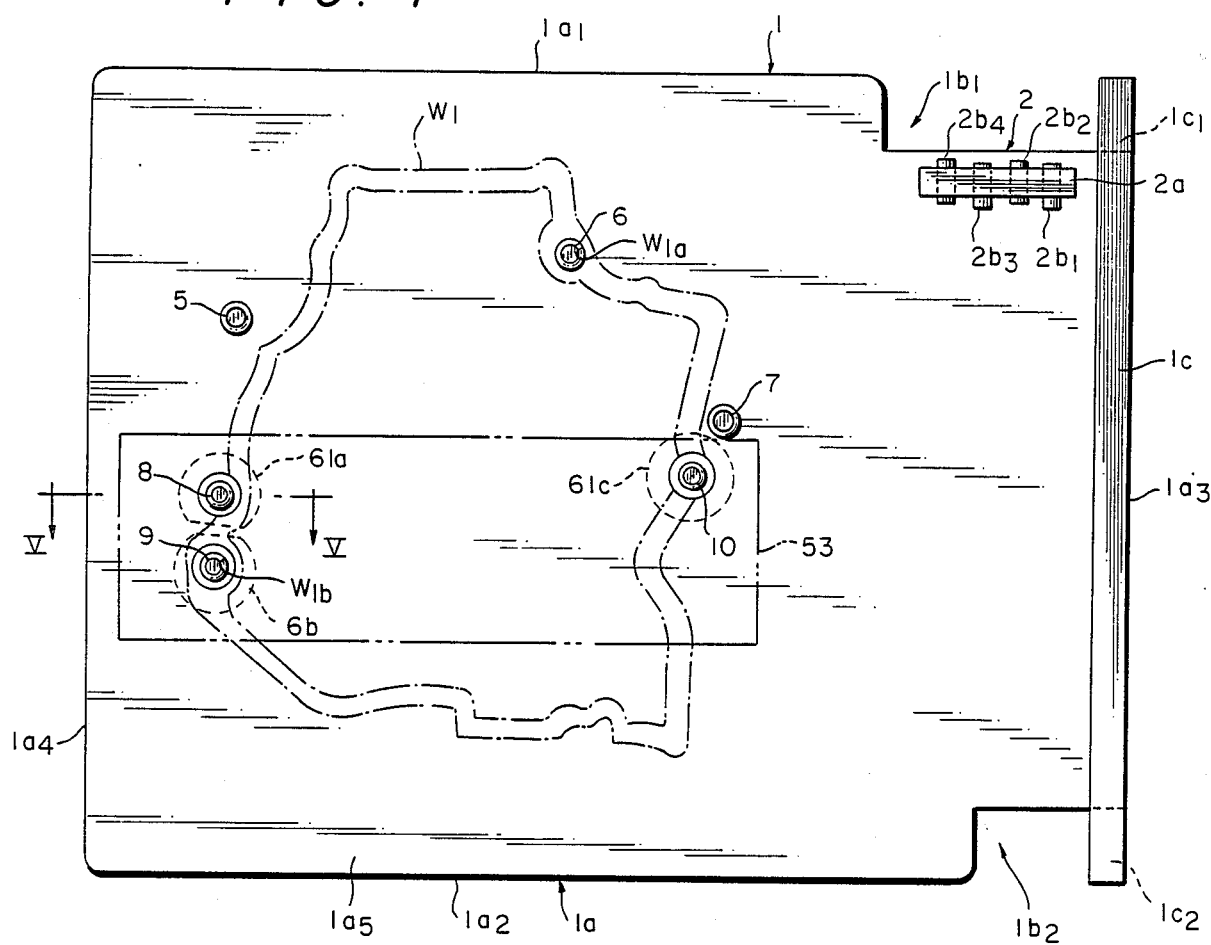
FIG. 1 is plan view of a novel pallet according to the present invention.
Figure 3:
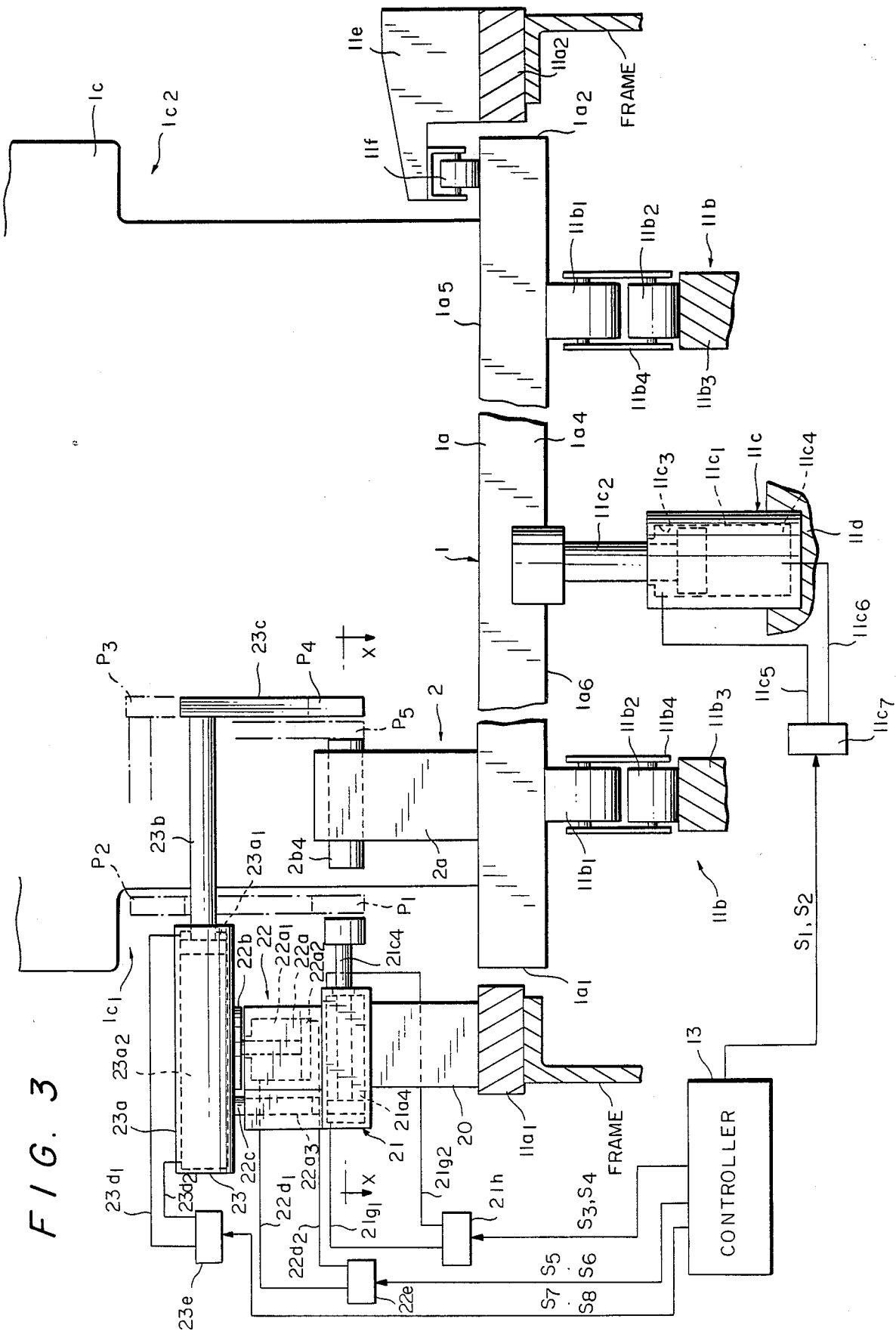
FIG. 3 is a sectional view taken along a line III—III of FIG. 2.

In FIG. 1, a pallet 1 has an oblong base plate $1a$, with cutouts $1b_1$ and $1b_2$ provided at each corner of long sides $1a_1$ and $1a_2$ of the base plate $1a$. A sub plate $1c$ is fixed on one short side $1a_3$ of the base plate $1a$ where the cutouts $1b_1$ and $1b_2$ are located, and extends vertically upwardly. Each side of the sub plate $1c$ has cutouts $1c_1$ and $1c_2$ at each lower corner so that the width of the lower side of the sub plate $1c$ is the same as the width of the short side $1a_3$ of the base plate $1a$. The width of the upper side of the sub plate $1c$ is the same as the width of the other short side $1a_4$ of the base plate $1a$ (as shown in FIG. 1 and FIG. 3). A bracket $2a$ is fixed on an upper surface $1a_5$ of the base plate $1a$ in parallel to the long side $1a_1$ where the cutout $1b_1$ is located. Four memory pins $2b_{1-4}$ are slidably mounted in the bracket $2a$. Each memory pin $2b_{1-4}$ is arranged along the long side $1a_1$ and slides in parallel to the upper surface $1a_6$ and the short side $1a_3$ of the base plate $1a$. The memory pins $2b_{1-4}$ and the bracket $2a$ are used as a memory unit 2 which indicates the type or kind of a workpiece to be put on the pallet, as will be described hereinafter.

Figure 7:
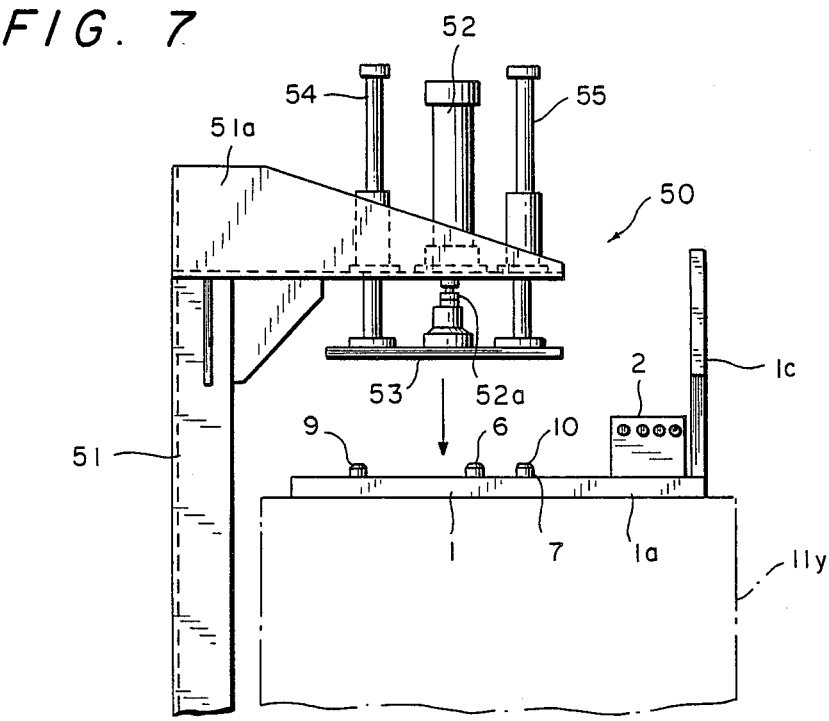
FIG. 7 is a front view of a positioning pin reset structure.
Figure 9:
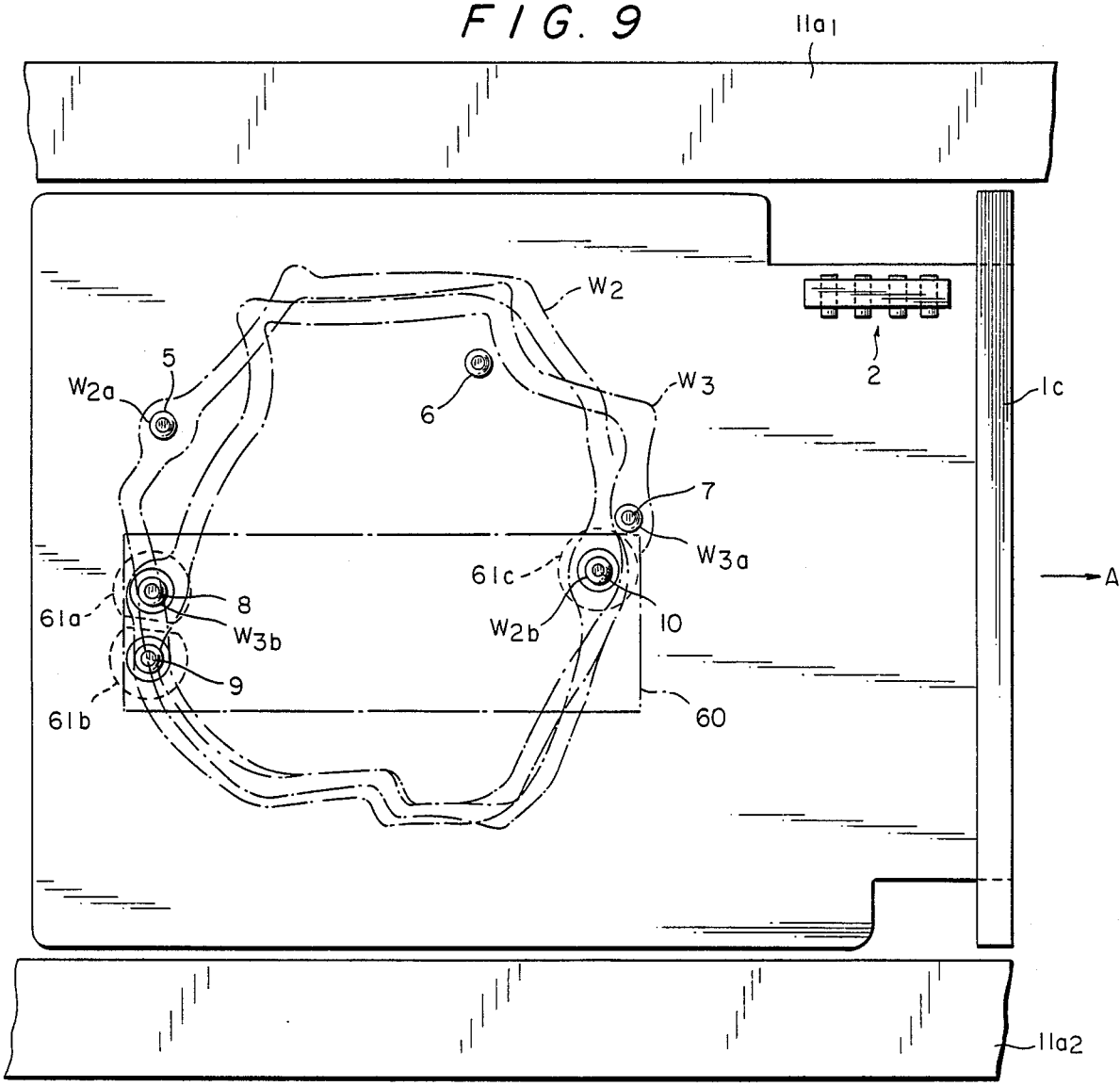
FIG. 9 is a fragmentary plan view showing the positioning set structure.

Three positioning pins 5, 6 and 7 are fixed on the upper surface $1a_5$ of the base plate $1a$, and extend vertically upwardly, respectively. As shown in FIG. 1, FIG. 7 and FIG. 9, each of the fixed positioning pins 5, 6 and 7 has a pillar shape provided with a bevel or taper on top. The locations of the fixed positioning pins 5, 6 and 7 on the pallet are determined according to the locations of positioning holes $W_{1a}$, $W_{2a}$ and $W_{3a}$ which are provided at under surfaces of workpieces $W_1$, $W_2$ and $W_3$, such as a transmission case, respectively, so that when one fixed positioning pin (for example, $W_5$) is inserted into one positioning hole (for example $W_{1a}$), the other fixed positioning pins (for example 6 and 7) do not interfere with the workpiece mounted on the pallet.

Three movable positioning pins 8, 9 and 10 are provided slidably mounted in the base plate $1a$. The movable positioning pins 8, 9 and 10 are able to be moved upwardly and downwardly to be projected and sunk or retracted with respect to the upper surface $1a_5$ of the pallet which serves as a workpiece set surface. The locations of the movable positioning pins 8, 9 and 10 are determined according to locations of positioning holes $W_{1b}$, $W_{2b}$ and $W_{3b}$ which are provided at the under surfaces of workpieces $W_1$, $W_2$ and $W_3$, respectively.

Figure 2:
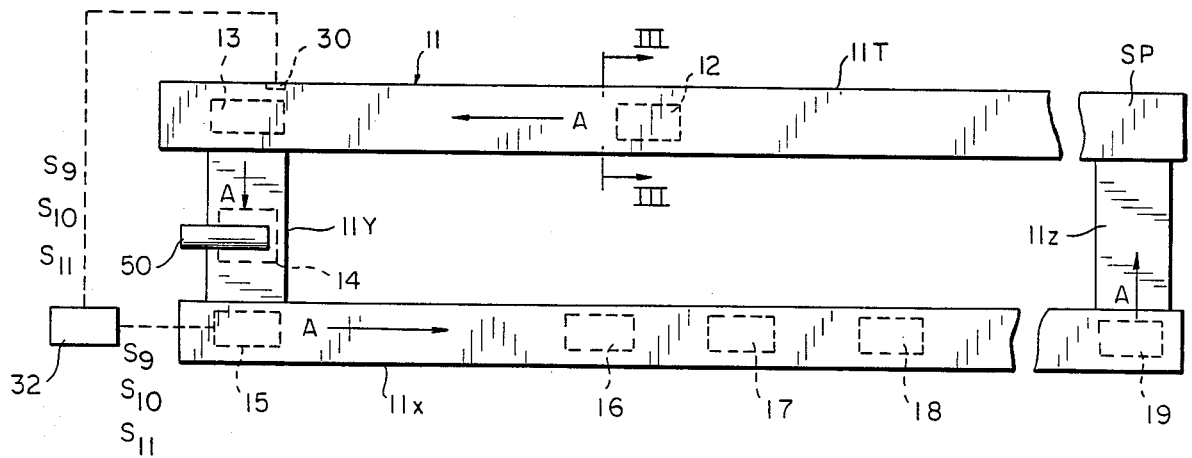
FIG. 2 is a fragmentary plan view of a working line carrying the novel pallet shown in FIG. 1.

As shown in FIG. 2, the pallet 1 is transported by a working line 11. The working line 11 comprises first line 11T, second 11Y which is at right angles to the first line 11T, third line 11X which is at right angles to the second line 11Y and is in parallel to the first line 11T, and fourth line 11Z which is at right angles to the third line 11X and is in parallel to the second line 11Y. These lines 11T, 11Y, 11X and 11Z form a closed circulating line.

An unloaded pallet is transported to a starting point SP of the first line 11T from the fourth line 11Z. The pallet 1 is transported to a memory station 12 which is provided in the middle of the first line 11T. In the first line 11T, the pallet 1 is transported in the condition that the short side $1a_4$ of the base plate $1a$ is a leading side to a transportation direction A of the first line 11T. On each pallet and workpiece, one positioning hole $W_{1a}$, $W_{2a}$, or $W_{3a}$ and one of the fixed positioning pin 5, 6 or 7 which is inserted into the positioning hole $W_{1a}$, $W_{2a}$ or $W_{3a}$ are located at opposite sides of the pallet and workpiece from positioning hole $W_{1b}$, $W_{2b}$ or $W_{3b}$ and one of the movable positioning pin 8, 9 or 10 which is inserted into the positioning hole $W_{1b}$, $W_{2b}$ or $W_{3b}$. Accordingly, as shown in FIG. 1 the workpiece $W_1$ is firmly positioned by use of the fixed positioning pin 6 and the movable positioning pin 9. The workpiece $W_2$ is also firmly positioned by use of the fixed positioning pin 5 and the movable positioning pin 10 (as shown in FIG. 9). And, the workpiece $W_3$ is also firmly positioned by use of the fixed positioning pin 7 and the movable positioning pin 8 (as shown in FIG. 9).

As shown in FIG. 3, the long sides $1a_1$ and $1a_2$ of the pallet 1 are guided by stationary guide members $11a_1$ and $11a_2$ of the working line 11. Lower surface $1a_6$ of the base plate $1a$ is supported by upper rollers $11b_1$ and $11b_1$ of a free flow type chain conveyor mechanism $11b$. Lower rollers $11b_2$ and $11b_2$ of the chain conveyor mechanism $11b$ are freely rotatably supported on supporting rails $11b_3$ and $11b_3$. And, each of the upper rollers $11b_1$ and $11b_1$ is connected with the lower rollers $11b_2$ and $11b_2$ respectively by chain links $11b_4$ and $11b_4$ which are driven in the transportation direction A.

A stopper device $11c$ is provided at a leading end of the memory station 12. The stopper device $11c$ is composed of a cylinder $11c_1$, a piston rod $11c_2$, pressure passages $11c_5$ and $11c_6$ and a switching valve $11c_7$.

The cylinder $11c_1$ is fixed to a base or frame member $11d$ of the working line 11. The piston rod $11c_2$ is slidably mounted with the cylinder $11c_1$ in order to move upwardly and downwardly. The lower end of the piston rod $11c_2$ is received in the cylinder $11c_1$ slidably and divides cylinder $11c$, into two chamber $11c_3$ and $11c_4$. The upper end of the piston rod $11c_2$ is positioned below the lower surface $1a_6$ of the base plate $1a$ when the piston rod $11c_2$ is moved downwardly, and is positioned above the lower surface $1a_6$ of the base plate $1a$ when the piston rod $11c_2$ is moved upwardly. Pressure lines, conduits or passages $11c_5$ and $11c_6$ are connected to the chambers $11c_3$ and $11c_4$, respectively, and supply a positive pressure by means of a hydraulic or air pump (not shown) to the chambers $11c_3$ and $11c_4$ respectively, or relieve the pressure from the chambers $11c_3$ and $11c_4$ to a drain tank (not shown), respectively. Switching valve $11c_7$ is provided in the pressure passages $11c_5$ and $11c_6$, and controls the supply and relief of pressure to the chambers $11c_3$ and $11c_4$ according to switching signals $s_1$ and $s_2$ of a controller 13.

Figure 10:
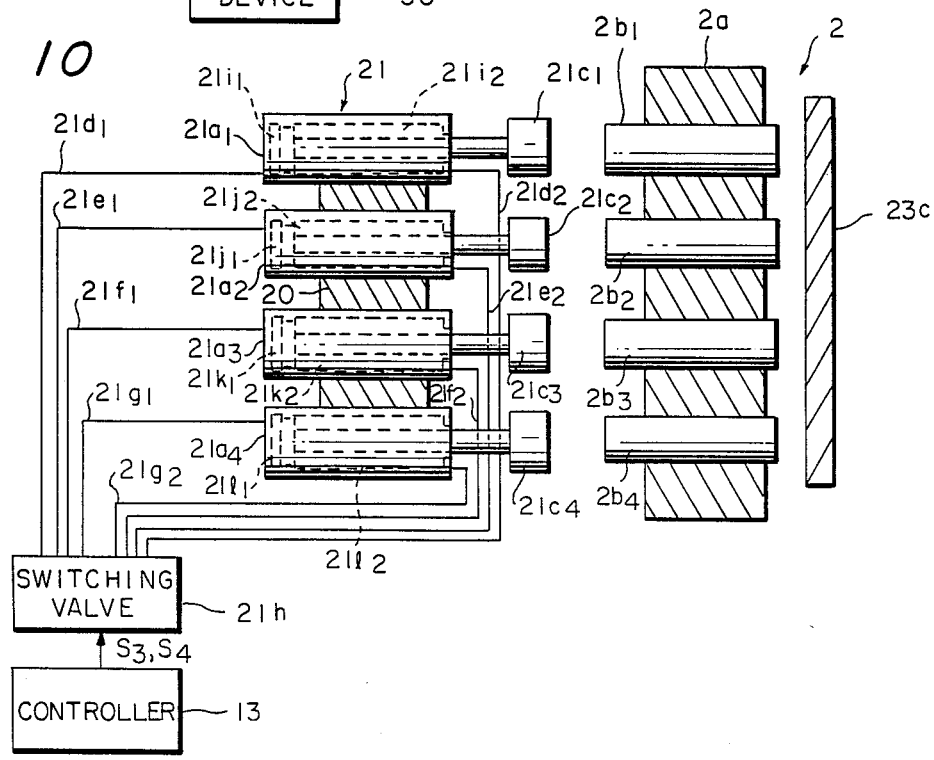
FIG. 10 is a sectional view taken along line X—X of FIG. 3.

A bracket $11e$ is fixed on the guide member $11a_2$ which guides the long side $1a_2$ of the base plate $1a$. A roller $11f$ is rotatably supported by bracket $11e$, and is able to contact with the upper surface $1a_5$ in the vicinity of the long side $1a_2$ of the base plate $1a$ for preventing upward movement of the pallet 1. The cutout $1c_2$ of the sub plate $1c$ prevents that the sub plate $1c$ interferes with the bracket $11e$ and the roller $11f$. At the memory station 12, a bracket 20 is fixed on an upper surface of the guide member $11a_1$. A memory set device 21 is fixed to the bracket 20. As shown in FIG. 10, the memory set device 21 is composed of four cylinder $21a_1$, $21a_2$, $21a_3$ and $21a_4$, four piston rods $21c_1$, $21c_2$, $21c_3$ and $21c_4$ which are mounted slidably to the cylinder $21a_1$, $21a_2$, $21a_3$ and $21a_4$, respectively, and pressure lines or passages $21d_1$, $21d_2$, $21e_1$, $21e_2$, $21f_1$, $21f_2$, $21g_1$ and $21g_2$, and a switching valve $21h$. The cylinders $21a_{1-4}$ lie in a horizontal plane and are fixed to an upper surface of the bracket 20. The cylinders $21a_{1-4}$ are arranged to register or align with the bracket $2a$ of the memory unit 2 relative to the memory pins $2b_{1-4}$. The piston rods $21c_2$, $21c_2$, $21c_3$ and $21c_4$ are mounted slidably in the cylinders $21a_1$, $21a_2$, $21a_3$ and $21a_4$, respectively.

The received ends of the piston rods $21c_1$, $21c_2$, $21c_3$ and $21c_4$ within the cylinders $21a_1$, $21a_2$, $21a_3$ and $21a_4$, respectively, divide each cylinder $21a_{1-4}$ into two chambers $21i_1$ and $21i_2$, $21j_1$ and $21j_2$, $21k_1$ and $21k_2$, and $21l_1$ and $21l_2$, respectively.

The longitudinal axes of the cylinders $21a_1$, $21a_2$, $21a_3$ and $21a_4$ and the piston $21c_1$, $21c_2$, $21c_3$ and $21c_4$ are aligned with longitudinal axes of the memory pins $2b_1$, $2b_2$, $2b_3$ and $2b_4$, respectively. The projecting or inner ends of the piston rods $21c_1$, $21c_2$, $21c_3$ and $21c_4$ face toward the outer ends of the memory pins $2b_1$, $2b_2$, $2b_3$ and $2b_4$, respectively. The inner ends of the piston rods $21c_1$, $21c_2$, $21c_3$ and $21c_4$ keep a predetermined spacing from the outer ends of the memory pins $2b_1$, $2b_2$, $2b_3$ and $2b_4$, respectively, when the piston rods $21c_{1-4}$ are drawn into the cylinders $21a_{1-4}$ (as shown in FIG. 10). When the piston rods $21c_{1-4}$ are moved inwardly, that is, toward the pins; the inner ends of the piston rods $21c_1$, $21c_2$, $21c_3$ and $21c_4$ are able to contact with the outer ends of the memory pins $2b_1$, $2b_2$, $2b_3$ and $2b_4$, respectively, and to push the memory pins $2b_1$, $2b_2$, $2b_3$ and $2b_4$ inwardly to a set position.

The pressure passages $21d_1$, $21d_2$, $21e_1$, $21e_2$, $21f_1$, $21f_2$, $21g_1$ and $21g_2$ are connected to the chambers $21i_1$, $21i_2$, $21j_1$, $21j_2$, $21k_1$, and $21l$ and $21l_2$, respectively and supply a positive pressure which is produced by an air or hydraulic pump (not shown) to the chambers $21i_1$, $21i$, $21j_1$, $21j_2$, $21k_1$, $21k_2$, $21l_1$, $21l_2$ respectively, or relieve the pressure from the chambers $21i_1$, $21i_2$, $21j_1$, $21j_2$, $21k_1$, $21k_2$, $21l_1$ and $21l_2$ to outside or a drain tank (not shown), respectively.

The switching valve $21h$ is provided in the pressure passages $21d_1$, $21d_2$, $21e_1$, $21e_2$, $21f_1$, $21f_2$, $21g_1$ and $21g_2$, and controls the supply and relief of the pressure to the chambers $21i_1$, $21i_2$, $21j_1$, $21j_2$, $21k_1$, $21k_2$, $21l_1$ and $21l_2$ according to switching signals $S_3$ and $S_4$ of the controller 13.

A lift device 22 is fixed to the bracket 20. The lift device 22 is composed of a cylinder $22a$, a piston rod $22b$, a guide rod $22c$, pressure passages $22d_1$ and $22d$ and a switching valve $22e$. The piston rod $22b$ is attached to the cylinder $22a$ which is fixed to the upper surface of the bracket 20 between the cylinders $21a_2$ and $21a_3$ of the memory set device 21 in order to be moved upwardly and downwardly. The lower end of the piston rod $22b$ is slidably received in the cylinder $22a$ and divides cylinder $22a$ into two chambers $22a_1$ and $22a_2$. The upper end of the piston rod $22b$ is fixed to a lower surface of a cylinder $23a$ of a memory reset device 23. The guide rod $22c$ is arranged in parallel to the piston rod $22b$ and is slidably received in a guide hole $22a_3$ which is provided in a side wall of the cylinder $221a$. The upper end of the guide rod $22c$ is fixed to the lower surface of the cylinder $23a$ of the memory reset device 23 so as to be moved upwardly and downwardly according to the movement of the piston rod $22b$. Therefore, the guide rod $22c$ prevents the piston rod $22b$ from leaning or tilting due to the weight of the memory reset device 23.

Pressure passages $22d_1$ and $22d_2$ are connected to chambers $22a_1$ and $22a_2$, respectively, and supply a positive pressure from an air or hydraulic source (not shown) to the chambers $22a_1$ and $22a_2$, respectively, or relieve the pressure from the chambers $22a_1$ and $22a_2$, respectively. Switching valve $22e$ is provided in the pressure passages $22d_1$ and $22d_2$, and controls the supply and relief of the pressure to the chamber $22a_1$ and $22a_2$ according to switching signals $S_5$ and $S_6$ of a controlled 13.

Piston rod $23b$ of the memory reset device 23 is received in the cylinder $23a$ in order to be moved inwardly and outwardly. Received or outer end of the piston rod $23b$ is provided in the cylinder $23a$ slidably and divides cylinder $23a$ into two chambers $23a_1$ and $23a_2$. An upper side of an oblong shaped reset plate $23c$ is fixed a the projecting end of the piston rod $23b$. The reset plate $23c$ extends vertically downwardly from the projecting end of the piston rod $23b$ and extends parallel to the bracket $2a$ of the memory unit 2.

Pressure passages $23d_1$ and $23d_2$ of the memory reset device 23 are connected to the chambers $23a_1$ and $23a_2$, respectively, and supply a positive pressure from an air or hydraulic source (not shown) to the chamber $23a_1$ and $23a_2$, respectively, or relieve the pressure from the chamber $23a_1$ and $23a_2$, respectively. Switching valve $23e$ of the memory reset device 23 is provided in the pressure passages $23d_1$ and $23d_2$, and controls the supply and relief of the pressure to the chamber $23a_1$ and $23a_2$ according to switching signals $S_7$ and $S_8$ of the controller 13.

As shown in FIG. 3, the reset plate $23c$ is able to be positioned in five positions $P_1$, $P_2$, $P_3$, $P_4$ and $P_5$. When the piston rod $22b$ of the lift device 22 is drawn into the cylinder $22a$ of the lift device, and also, the piston rod $23b$ of the memory reset device 23 is drawn into the cylinder $23a$ of the memory reset device 23, the reset plate $23c$ is located in the position $P_1$. In the position $P_1$, the reset plate $23c$ and an inner end of the cylinder $23a$ of the memory reset device 23 are located in an area corresponding to the cutout $1c_1$ of the sub plate $1c$ so that no interference exists between the memory reset device 23 and the sub plate $1c$ of the pallet 1, even if the sub plate $1c$ passes beside the memory reset device 23. Also, the predetermined spacing between the piston rods $21c_{1-4}$ of the memory set device 21 and the memory pins $2b_{1-4}$ is set, so no interference exists between lower side of the set plate $23c$ and the inner ends of the piston rods $21c_{1-4}$ whenever the piston rods $21c_{1-4}$ are drawn into the cylinders $21a_{1-4}$ of the memory set device 21. In case the piston rod $22b$ of the lift device 22 is moved upwardly from the above-mentioned condition, the position $P_2$ is carried out or effected. And, the position $PP_3$ is carried out when the piston rod $23b$ of the memory reset device 23 is moved inwardly from the above-mentioned condition. Between the position $P_2$ an the position $P_3$, a lower edge of the reset plate $23c$ is positioned above the bracket $2a$ of the memory unit 2 for preventing any interference, between the reset plate $23c$ and the bracket $2a$. The position $P_4$ is carried out by the condition which is shown in FIG. 3. And, when the piston rod $23b$ of the memory reset device 23 is drawn a predetermined stoke into the cylinder $23a$ of the memory reset device 23 from the condition which is shown in FIG. 3, the position $P_5$ is carried out.

In the position $P_4$, the lower side of the reset plate $2c$ is able to be faced to and keep a predetermined space from the inner ends of the memory pins $2b_{1-4}$ even if the memory pins $21b_{1-4}$ are positioned in any set position.

Before the pallet 1 is transported into the memory station 12, the piston rod $11c_2$ of the stopper device 11 is memory set device 21 are also drawn into the cylinders $21a_{1-4}$ respectively. The piston rod $22b$ of the lift device 22 and the piston rod $23b$ of the memory reset device 23 are drawn into the cylinder $22a$ and the cylinder $23a$, respectively, so that the reset plate $23c$ is positioned in the position $P_1$. When the pallet 1 is transported into the memory station 12 by the chain conveyor mechanism 11b, the controller 13 sends the switching signal $S_1$ to the switching valve $11c_7$ in order to supply pressure to the chamber $11c_4$ by the pressure passage $11c_6$ and relieve th4e pressure from the chamber $11c_3$ by the pressure passage $11c_5$ so that the piston rod $11c_2$ of the stopper device $11c$ is moved upwardly. Therefore, the short side $1a_4$ of the pallet 1 contacts with the upper end of the piston rod $11c_2$, and the pallet 1 is stopped in the memory station 12.

When the pallet 1 is stopped in the memory station 12 completely, the controller sends the switching signal $S_5$ to the switching valve $22e$ of the lift device 22 in order to supply pressure to the chamber $22a_2$ by the pressure passage $22d_2$ and relieve the pressure from the chamber $22a_1$ by the pressure passage $22d_1$ so that the piston rod $22b$ is moved upwardly. Therefore, the reset plate $23c$ is moved from the position $P_1$ to the position $P_2$. Then, the controller 13 sends the switching signal $S_7$ to the switching valve $23e$ of the memory reset device 23 in order to supply pressure to the chamber $23a_2$ by the pressure passage $23d_2$ and relieve the pressure from the chamber $23a_1$ by the pressure passage $23d_1$ so that the piston rod $23b$ is moved inwardly. Therefore, the reset plate $23c$ is moved from the position $P_2$ to the position $P_3$.

Then, the controller 13 sends the switching signal $S_6$ to the switching valve $22e$ of the lift device 22 in order to supply pressure to the chamber $22a_1$ by the pressure passage $22d_1$ and relieve the pressure from the chamber $22a_2$ by the pressure passage $22d_2$ so that the piston rod $22b$ is moved downwardly. Therefore, the reset plate $23c$ is moved from the position $P_3$ to the position $P_4$. And, the controller 13 sends the switching signal $S_8$ to the switching valve $23e$ of the memory reset device 23 for a predetermined time in order to supply pressure to the chamber $23a_1$ by the pressure passage $23d_1$ and relieve the pressure from the chamber $23a_2$ by the pressure passage $23d_2$ so that the piston rod $23b$ is moved outwardly a predetermined stroke. Therefore, the reset plate $23c$ is moved from the position $P_4$ to the position $P_5$. When the reset plate $23c$ is moved from the position $P_4$ to the position $P_5$, the lower side of the reset plate $23c$ contacts with the memory pins $2b_{1-4}$ and pushes the memory pins $2b_{1-4}$ outwardly so that all memory pins $2b_{1-4}$ are positioned in a preset position which is shown in FIG. 10. After the above-mentioned memory reset operation, the controller sends the switching signals in order of $S_7$, $S_5$ and $S_2$ so that the reset plate is returned to the position $P_2$.

Figure 11A:
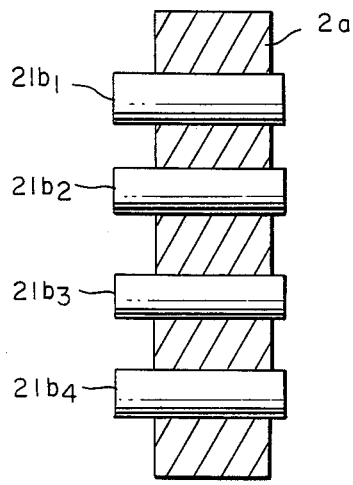
FIG. 11 is a sectional view showing three different setting positions of the memory unit.

In this embodiment, three kinds of workpieces $W_1$, $W_2$ and $W_3$ will be loaded on the pallet 1 according to a predetermined working program or order. The memory unit 2 will be able to memorize the kind of workpiece by positions of the memory pins $21b_{1-4}$. The workpiece $W_1$, $W_2$ and $W_3$ are represented by conditions which are shown in FIG. 11(a), (b) and (c) respectively.

The predetermined working program or order is memorized in the controller 13 in order to send memory set signals or the switching signals $S_3$ and $S_4$ to the memory set device 21.

Figure 11B:
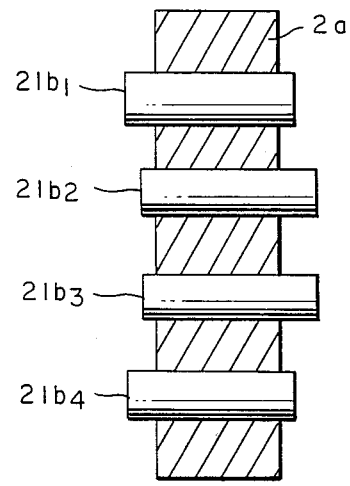

After the reset plate $23c$ is returned to the position $P_2$, the controller 13 decides the kind of workpiece which will be loaded on the pallet 1. When the controller 13 decides that the workpiece $W_1$ will be loaded on the pallet 1, the controller 13 sends no switching signal to the switching valve $21h$ and a memory set operation is finished. Therefore, the memory pins $21b_{1-4}$ are positioned in the set condition which is shown in FIG. 11(a). When the controller 13 decides that the workpiece $W_2$ will be loaded on the pallet 1, the controller 13 sends the switching signal $S_3$ to the switching valve $21h$ of the memory set device 21 in order to supply the pressure to the chambers $21j_1$ and $21k_1$ by the pressure passages $21e_1$ and $21f_1$, respectively, and relieve the pressure from the chambers $21j_2$ and $21k_2$ by the pressure passages $21e_2$ and $21f_2$, respectively, so that the piston rods $21c_2$ and $21c_3$ are moved inwardly and push the memory pins $2b_2$ and $2b_3$ inwardly respectively. Then, the switching valve $21h$ is switched in order to supply pressure to the chambers $21j_2$ and $21k_2$ by the pressure passages $21e_2$ and $21f_2$, respectively, and relieve the pressure from the chambers $21j_1$ and $21k_1$ by the pressure passages $21e_1$ and $21f_1$, respectively, so that the piston rods $21c_2$ and $21c_3$ are drawing to the cylinders $21a_2$ and $21a_3$, respectively. Therefore, the memory pins $21b_{1-4}$ are positioned in the set condition which is shown in FIG. 11(b).

When the controller 13 decides that the workpiece $W_3$ will be loaded on the pallet 1, the controller 13 sends the switching signal $S_4$ to the switching valve $21h$ of the memory set device 21 in order to supply pressure to the chambers $21i_1$, $21j_1$, $21k_1$ and $21l_1$ by the pressure passages $21d_1$, $21e_1$, $21f_1$ and $21g_1$, respectively, and relieve the pressure from the chamber $21i_2$, $21j_2$, $21k_2$ and $21l_2$ by the pressure passages $21d_2$, $21e_2$, $21f_2$ and $21g_2$, respectively, so that the piston rods $21c_1$, $21c_2$, $21c_3$ and $21c_4$ are moved inwardly and push the memory pins $2b_1$, $2b_2$, $2b_3$ and $2b_4$, respectively. Then, the switching valve $21h$ is switched in order to supply pressure to the chambers $21i_1$, $21j_2$, $21k_2$ and $21l_2$ by the pressure passages $21d_2$, $21e_2$, $21f_2$ and $21g_2$, respectively, and relieve the pressure from the chambers $21i_1$, $21j_1$, $21k_1$ and $21l_1$ by the pressure passages $21d_1$, $21e_1$, $21f_1$ and $21g_1$, respectively, so that the piston rods $21c_1$, $21c_2$, $21c_3$ and $21c_4$ are drawn into the cylinders $21a_1$, $21a_2$, $21a_3$ and $21a_4$ respectively.

Figure 11C:
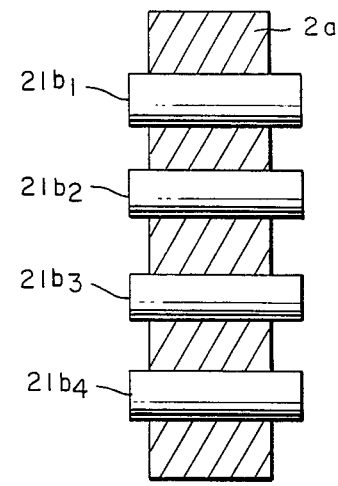

Therefore, the memory pins $2b_{1-4}$ are positioned in the set condition which is shown in FIG. 11(c). After the above-mentioned memory reset operation, the controller 13 sends the switching signal $S_6$ to the switching valve so that the reset plato 23C is moved from the position $P_2$ to the position $P_1$.

Then, the controller 13 sends the switching signal $S_2$ to the switching valve $11C_7$ in order to supply pressure to the chamber $11C_3$ by the pressure passage $11C_5$ and relieve the pressure from the chamber $11_4$ by the pressure passage $11C_6$ so the pallet 1 is relieved from the stopper device 11C and, is transported by the chain conveyer mechanism 11b to a read station 13 which is provided at a leading edge of the first line 11T.

Each of the other stations which are described hereinafter has the same type of the stopper device 11C at the leading end of the station for stopping the pallet 1.

Figure 4:
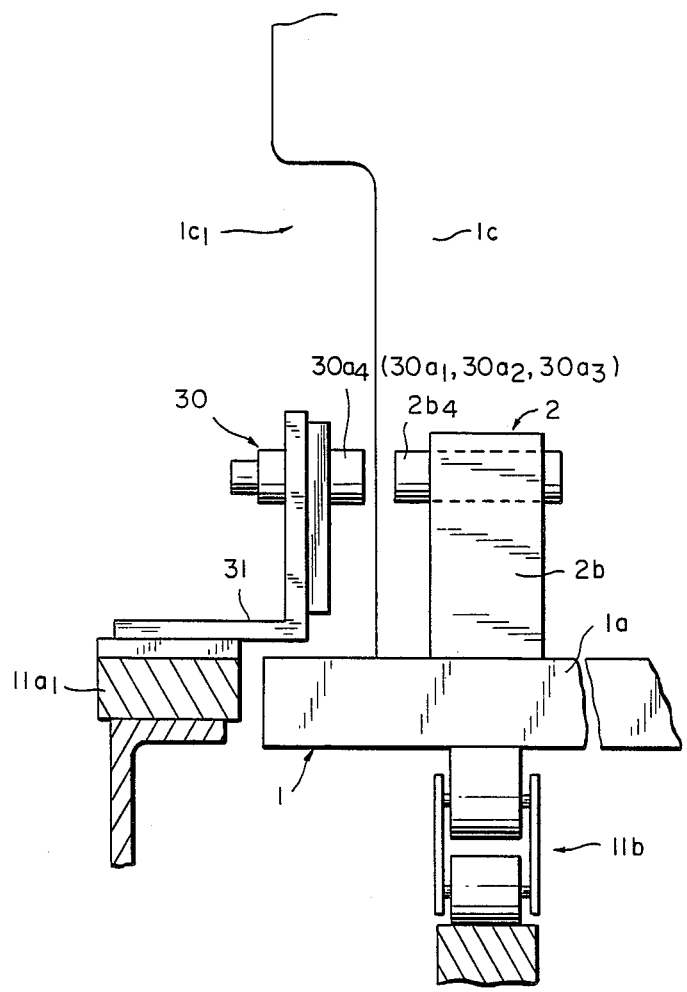
FIG. 4 is a front view of a workpiece detecting structure.

As shown in FIG. 2 and FIG. 4 the kind of the workpiece which is memorized in the memory unit 2 is read by a read device 30 when the pallet 1 is stopped in the read station 13. The read device 30 is fixed on the guide member $11a_1$ of the working line 11 by a bracket 31 in a manner that four sensors $30a_1$, $30a_2$, $30a_3$ and $30a_4$ ($30a_{1-3}$ are not shown in FIG. 4), such as, a magnetic non-contact sensor of the read device 30 are faced to the outer ends of the memory pins $2b_1$, $2b_2$, $2b_3b$ and $2b_4$, respectively. The read device is located in an area corresponding to the cut out $1C_1$ of the sub plate 1C so that no interference exists between the read device 30 and the sub plate 1C even if the sub plate 1C passes beside the read device 30. The sensors $30a_{1-4}$ detect the positions of the memory pins $2b_{1-4}$. The set positions show the kind of workpiece. The read device sends a "kind" signal $S_9$, $S_{10}$ or $S_{11}$ to a shift register 32 corresponding to the workpiece $W_1$, $W_2$ or $W_3$, respectively carried on the pallet 1.

Figure 5:
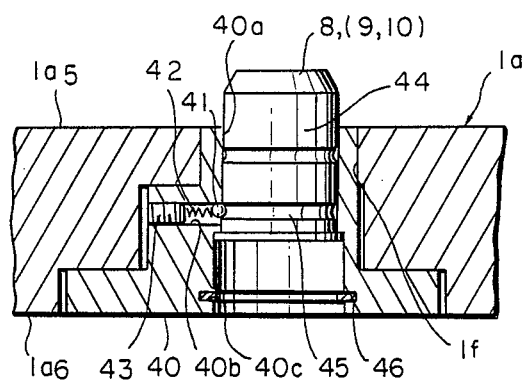
FIG. 5 is a sectional view taken along line V—V of FIG. 1 showing a set position of a positioning pin.
Figure 6:
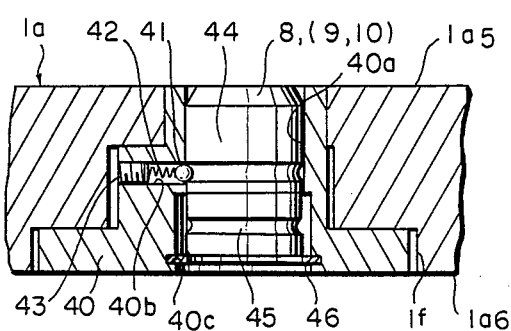
FIG. 6 is a sectional view showing a reset position of the positioning pin.

Thereafter, the pallet 1 is transported to a movable positioning pin reset station 14 which is provided at the second line 11Y. In the second line 11Y, the pallet 1 is transported in the condition that the long side $1a_2$ of the base plate $1a$ is a leading side to the transportation direction A of the second line 11Y. As shown in FIG. 5 and FIG. 6, the pallet 1 has three through holes $1f$ which penetrate the base plate $1a$ from the upper surface $1a_5$ to the lower surface $1a_6$. A holder 40 is fixed into each through hole $1f$ and has a through hole $40a$ which is provided at a right angle to the upper surface $1a_5$ of the base plate $1a$. One of the movable positioning pins 8, 9 and 10, which are formed in pillar shape, is slidably fitted in the through hole $40a$.

The holder 40 has a threaded hole $40b$ which is provided at a right angle to the through hole $40a$. In the threaded hole $40b$, there is a ball or detent 41 which is urged by a spring 42 for maintaining the position of the movable positioning pin 8, 9, or 10. A screw 43 is threaded into the threaded hole $40b$ for adjusting the urging force of the spring 42. The peripheral surface of each movable positioning pin 8, 9, or 10 has two annular grooves 44 and 45 which are spaced along the longitudinal axis of the movable positioning pin 8, 9, 10. As shown in FIG. 5, when the ball or detent 41 is engaged with the annular groove 45, the movable positioning pin 8, 9 or 10 is maintained at a set position such that the movable positioning pin 8, 9 or 10 protrudes from the upper surface $1a_5$ of the base plate $1a$. Also, as shown in FIG. 6, when ball 41 is engaged with the annular groove 44, the movable positioning pin 8, 9, or 10 is maintained at a reset position such that the movable positioning pin 8, 9 or 10 sinks under or is retracted even with or beneath the upper surface $1a_5$ of the base plate $1a$. The holder 40 has an annular groove $40c$ at lower edge of the through hole $40a$. In the annular groove $40c$ there is a snap ring 46 so that the movable positioning pin 8, 9 or 10 is prevented from falling out.

As shown in FIG. 7 a positioning pin reset device 50 is provided at the positioning pin reset station 14. The positioning pin reset device 50 comprises a support bracket 51, a cylinder 52, a push plate 53 and two slide bars 54 and 55. The support bracket 51 is disposed at the positioning pin reset station 14. The cylinder 52 is fixed vertically to a horizontal member $51a$ of the support bracket 51 above the second line 11Y. The longitudinal vertical axis of the cylinder 52 is perpendicular to the upper surface $1a_5$ of the pallet 1 which is stopped at the positioning pin reset station 14 by a stopper device as described. The cylinder 52 has a piston rod $52a$ which reciprocates vertically by hydraulic or air power. A free or projecting end of the piston rod $52a$ is connected with the push plate 53. As shown in FIG. 1, the push plate 53 has an area sufficient to cover all of the movable positioning pins 8, 9 and 10 at once and not to interfere with the fixed positioning pins 5, 6 and 7. The slide bars 54 and 55 which are parallel to the cylinder 52 are slidably supported to the horizontal member $51a$ of the support bracket 51, and the lower ends of the side bars 54 and 55 are connected to the push plate 53.

Therefore when the push plate 53 is stroked downwardly by the piston rod $52a$, the positioning pins 8, 9 and 10 are pressed downwardly by the push plate 53 so that all of the positioning pins 8, 9 and 10 are moved at once to the reset position as shown in FIG. 6. After the above-mentioned positioning pins reset operation, the pallet 1 is transported to a positioning pin set station 15 which is provided at a starting point of the third line 11X by the chain conveyor mechanism $11b$. At the positioning pin set station 15, the pallet 1 is in the condition that the sub plate $1c$ of the base plate 1 is leading to the transportation direction A of the third line 11X.

Figure 8:
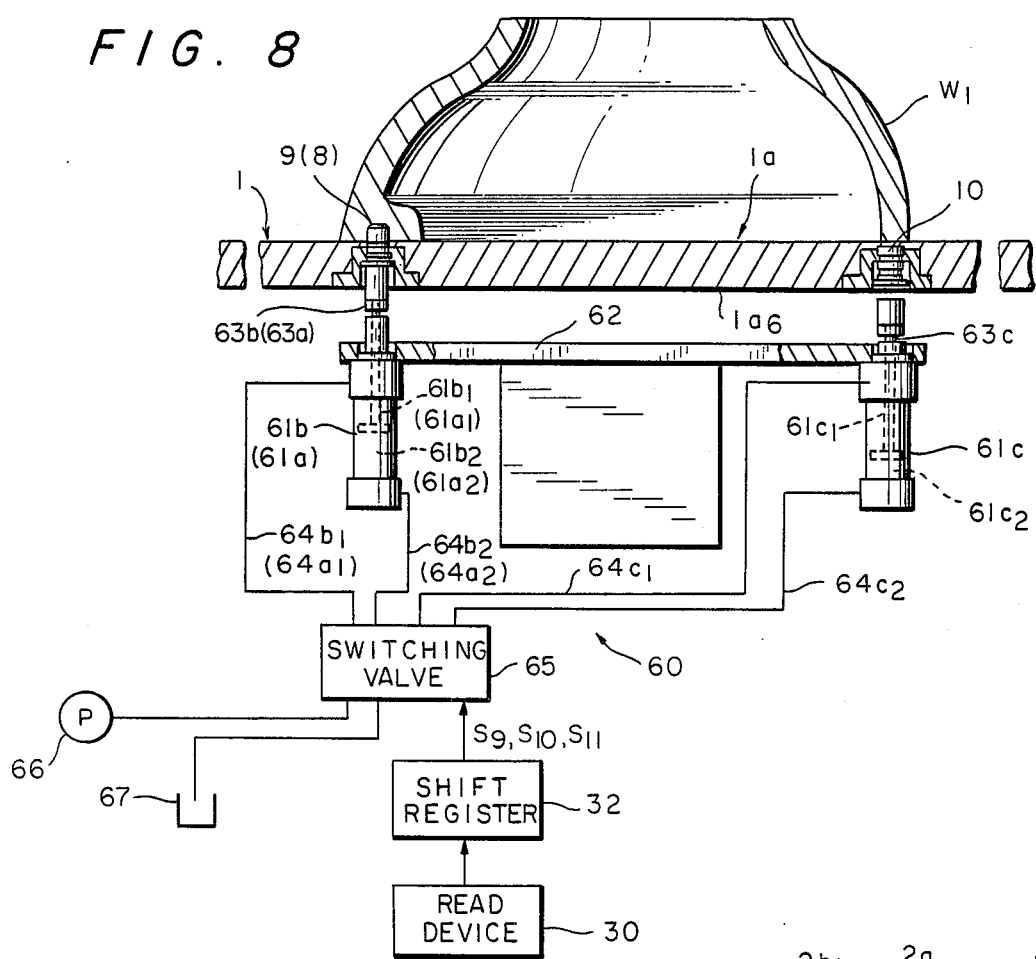
FIG. 8 is a sectional view showing a positioning pin set structure.

As shown in FIG. 8 and FIG. 9, a positioning pin set device 60 is provided at the positioning pin set station 15 below the plate $1a$ which is stopped, in the positioning pin set station 15, by a stopper device as described. The positioning pin set device 60 is composed of three cylinders $61a$, $61b$ and $61c$ fixed vertically to fixed support bracket 62 which is located in parallel to the base plate $1a$. Three piston rods $63a$, $63b$ and $63c$ are slidably mounted in the cylinders $61a$, $61b$ and $61c$, respectively; pressure passages $64a_1$, $64a_2$, $64b_1$, $64b_2$, $64c_1$ and $64c_2$ and a switching valve 65 provide pressure and relief. The piston rods $63a$, $63b$ and $63c$ extend vertically upwardly from the cylinders $61a$, $61b$ and $61c$. Upper ends of the piston rods $63a$, $63b$ and $63c$ are registered with, faced, oriented, aligned, or indexed to lower ends of the movable pins 8, 9 and 10, respectively, so that the piston rods $63a$, $63b$ and $63c$ are able to push the movable pins 8, 9 and 10 upwardly from the reset position to the set position, respectively, when the piston rods are moved upwardly. Lower ends of the piston rods $63a$, $63b$ and $63c$ are provided in the cylinders $61a$, $61b$ and $61c$, respectively, and divide the cylinders $61a$, $61b$ and $61c$ into two chambers $61a_1$ and $61a_2$, $61b_1$ and $61b_2$ and $61c_1$ and $61c_2$, respectively. The pressure passages $64a_1$, $64a_2$, $64b_1$, $64b_2$, and $64c_1$ and $64c_2$, are connected, respectively, in order to supply a positive pressure which is produced from an air or hydraulic pump 66 or relieve the pressure to outside or a drain tank 67. The switch valve 65 is provided in the pressure passages $64a_1$, $64a_2$, $64b_1$, $64b_2$, $64c_1$ and $64c_2$ in order to switch the supply and relief of the pressure according to switching signals $S_9$, $S_{10}$ and $S_{11}$ of the shift register 32.

When the pallet 1 is transported to the positioning pin set station 15, the shift register 32 sends one of the switching signals $S_9$, $S_{10}$ and $S_{11}$ which is correlated with the kind of workpiece to be mounted on pallet 1 to the switching valve 65 in the order of memorized signal on first-memorized-first sent basis. When the switching signal $S_9$ which shows that the workpiece $W_1$ will be loaded on the pallet 1 is sent to the switching valve 65, the switching valve 65 is switched so that the pressure is supplied to the chamber $61b_2$ by the pressure passage $64b_2$ and the pressure in the chamber $61b_1$ is relieved by the pressure passage $64b_1$. Therefore, the piston rod $63b$ is moved upwardly so as to push the movable position pin 9 upwardly from the reset position to the set position. The pressure in the chamber $61a_1$ and the chamber $61c_1$ are kept so that the piston rod $63a$ and the piston rod $63c$ are kept in a down position so that the upper ends of the piston rods $63a$ and $63c$ keep a predetermined spacing from the lower surface $1a_6$ of the base plate $1a$.

When the switching signal $S_{10}$ is sent to the switching valve 65 which shows that the workpiece $W_2$ will be loaded on the pallet 1, the switching valve 65 is switched so that the pressure is supplied to the chamber $61c_2$ by the pressure passage $64c_2$ and the pressure in the chamber $61c_1$ is relieved by the pressure passage $64c_1$. Therefore, the piston rod $63c$ is moved upwardly so as to push the movable positioning pin 10 upwardly from the reset position to the set position. The pressure in the chamber $61a_1$ and the chamber $61b_1$ is kept so that the piston rod $63a$ and the piston rod $63b$ are kept in the down position.

When the switching signal $S_{11}$ is sent to the switching valve 65, which shows that the workpiece $W_3$ will be loaded on the pallet 1, the switching valve 65 is switch so that the pressure is supplied to the chamber $61a_2$ by the pressure passage $64a_2$ and pressure in the chamber $61a_1$ is relieved by the pressure passage $64a_1$. Therefore, the piston rod $63a$ is moved upwardly so as to push the movable position pin 8 upwardly from the reset position of the set position. The hydraulic pressure in the chamber $61b_1$ and the chamber $61c_1$ is kept so that the piston rod $63b$ and the piston rod $63c$ are kept in the down position.

In the condition that one of the piston rods $63a$, $63b$ and $63c$ has pushed one of the movable positioning pins 8, 9 and 10 into the set position by means of the above-mentioned positioning pin set operation, one of the workpieces $W_1$, $W_2$ and $W_3$, which is corresponding to the switching signal $S_9$, $S_{10}$, $S_{11}$, is loaded to the base plate $1a$ and is positioned by one of the fixed positioning pins 5, 6 and 7 and one of the movable positioning pins 8, 9 and 10. After the workpiece positioning operation the switching valve 65 is switched in order to move downwardly the piston rod $63a$, $63b$ or $63c$ which has pushed one of the movable pins 8, 9 and 10 upwardly. Then the pallet 1 is transported to working stations 16, 17 and 18 in successive order. At the working stations 16, 17 and 18, other parts are fitted to the workpiece, or the workpiece is machined by an automatic machining device or any other operation is carried out.

It is possible to guide the sub plate $1c$ by the chain conveyor mechanism $11b$ in order to change the position at a right angle comparing with the position in the first line $11T$ and the second line $11Y$ at the working stations 16, 17 and 18. In the above-mentioned condition, even if the upper side surface of the sub plate $1c$ is guided by the same type of roller device as the roller $11f$ and the bracket $11e$, interference between the roller device and the base plate $1a$ is prevented by the cutouts $1b_1$ and $1b_2$ of the base plate $1a$.

After the above-mentioned assembly or machining operation, the pallet 1 is transported to a workpiece removing station 19 which is provided at the edge of the third line $11X$ in order to remove the workpiece from the pallet 1. Then, the pallet 1 which is now unloaded is transported to the fourth line $11Z$ in the condition that the long side $1a_1$ of the base plate $1a$ is a leading side to the transportation direction A of the fourth line $11Z$.

In the embodiment described above, the fixed positioning pins 5, 6 and 7 are fixed to the base plate $1a$. These fixed positioning pins 5, 6 and 7, however, may be changeable to positioning pins such as the movable positioning pins 8, 9 and 10 so that all positioning pins are projectable and retractable Although the invention has been described with reference to a preferred embodiment, changes are possible which will be evident to those skilled in the art. Such changes are deemed to fall within the purview of the invention as claimed.

What is claimed:

1. A method for positioning a plurality of different workpieces to successive pallets for transport along a working line, each pallet having an upper workpiece set surface, the method comprising the steps of:
   (a) providing plural positioning pins at discrete locations on each of a plurality of pallets, each positioning pin is having a set position whereupon it protrudes above the workpiece set surface of the pallet and a reset position whereupon it is retracted not to protrude above the workpiece set surface of the pallet;
   (b) resetting all the plural positioning pins of the pallet to the reset position;
   (c) setting at least one selected positioning pin to the set position ready to coact with one of the plurality of different workpiece;
   (d) and positioning a one of the plurality of different workpieces on the pallet by fitting the selected protruded positioning pin into a predetermined positioning hole defined by the one of the plurality of the workpieces.

2. A method as claimed in claim 1, which further comprises the step of memorizing the one of the plurality of different workpiece to be positioned on the pallet before said setting step;
   reading the memorized one of the plurality of different workpieces prior to said setting step, and setting said pin responsive to the reading step.

3. Apparatus for positioning a workpiece on a pallet transported on a working line, the pallet being capable of transporting plural kinds of workpieces, said apparatus comprising:
   a pallet having a workpiece set upper surface positioning means for positioning a workpiece on said pallet comprised of plural positioning pins mounted on and distributed at spaced locations on said pallet such that the pallet can transport any one of plural kinds of workpieces;
   each positioning pin having two possible positions, a set position in which the pin protrudes above the workpiece set surface of the pallet and a rest position in which the pin is retracted not to protrude above the workpiece set surface of the pallet;
   resetting means for resetting all positioning pins to said reset position; and
   setting means for setting a selected positioning pin to said set position, so that the pallet can receive and retain thereon during transport along a working line a particular kind of workpiece that has a positioning hole correlated with the set selected positioning pin selected workpiece.

4. Apparatus as in claim 3, wherein the positioning means includes detent means for holding each positioning pin in its two positions.

5. Apparatus as in claim 4, wherein the detent means includes a biased ball and the pins have a pair of axially spaced grooves which cooperate with the biased ball.

6. Apparatus as in claim 3, wherein the resetting means includes a push plate which can contact all positioning pins of the pallet to move them from the set position to the reset position, and a proton cylinder assembly connected to the plate for resetting any protruding positioning pin to the reset position.

7. Apparatus as in claim 3, wherein the setting means includes plural piston and cylinder assemblies for pushing the positioning pins to the set position.

8. An apparatus for positioning one of plural kinds of workpieces to a pallet transported on a working line, said apparatus comprising:
  (a) a pallet having a workpiece set upper surface;
  (b) positioning means for positioning a workpiece to the pallet including plural positioning pins mounted on the pallet at spaced locations;
    (i) each positioning pin having two positions, a set position in which the pin extends from the workpiece set surface of the pallet and a reset position in which the pin is retracted not to protrude from the workpiece set surface of the pallet;
    (ii) each said positioning pin having a pair of axially spaced grooves;
    (iii) said positioning means further including spring biased elements which resiliently engage in the grooves to define the set position and reset position of the positioning pin;
  (c) resetting means including a push plate for contacting any protruding positioning pin and a piston and cylinder assembly to move the push plate for resetting any protruding positioning pin to the reset position; and
  (d) setting means having plural piston and cylinder assemblies to coact with the plural positioning pins for setting a selected positioning pin to its said set position to cooperate with a hole defined in a selected workpiece to retain same on the pallet.

9. Apparatus as in claim 3, wherein the positioning means include a fixed positioning pin which projects from the workpiece set surface of the pallet and cooperates with the positioning pin for positioning and retaining a workpiece.

10. Apparatus as in claim 3, further including a working line formed in a circulation mode;
  a reset station in which is disposed the resetting means, a set station downstream of the reset station and in which is disposed the setting means, and a working station which is located downstream of the set station and upstream of the reset station.

11. The apparatus as in claim 10, further comprising:
  memory means disposed on the pallet for memorizing the kind of the workpiece to be placed on the pallet;
  workpiece kind setting means disposed in a workpiece kind set station located downstream of the working station and upstream of the set station for setting the memory means for the kind of workpiece to be carried by the pallet with respect to a working program;
  and workpiece kind reading means disposed in a workpiece kind reading station which is disposed between the workpiece kind set station and the set station for reading the kind of the workpiece which has been memorized in the memorizing mean and for providing information to the setting means of the kind of workpiece to be carried on the pallet.

* * * * *